(12) United States Patent
Adhikari

(10) Patent No.: US 10,348,691 B2
(45) Date of Patent: Jul. 9, 2019

(54) SYSTEM AND METHOD FOR CONTROLLING, SHARING, RELEASE AND MANAGEMENT OF DIGITAL DATA BETWEEN SMART MOBILE DEVICE(S) AND EXTERNAL DEVICE(S) USING A CONNECTOR PAD

(71) Applicant: Abhishek Adhikari, Lake Forest, IL (US)

(72) Inventor: Abhishek Adhikari, Lake Forest, IL (US)

(*) Notice: Subject to any disclaimer, the term of this patent is extended or adjusted under 35 U.S.C. 154(b) by 0 days.

(21) Appl. No.: 15/979,009

(22) Filed: May 14, 2018

(65) Prior Publication Data
US 2018/0302372 A1    Oct. 18, 2018

Related U.S. Application Data

(63) Continuation-in-part of application No. 14/940,256, filed on Nov. 13, 2015, now Pat. No. 9,998,848.

(60) Provisional application No. 62/080,314, filed on Nov. 15, 2014.

(51) Int. Cl.
| | |
|---|---|
| *H04L 29/06* | (2006.01) |
| *H04L 29/08* | (2006.01) |
| *H04W 4/80* | (2018.01) |
| *H04W 88/02* | (2009.01) |

(52) U.S. Cl.
CPC ............ *H04L 63/029* (2013.01); *H04L 67/06* (2013.01); *H04L 67/1095* (2013.01); *H04L 63/1408* (2013.01); *H04W 4/80* (2018.02); *H04W 88/02* (2013.01)

(58) Field of Classification Search
CPC .... H04L 63/029; H04L 67/1095; H04L 67/06
USPC ........................................................ 455/41.1
See application file for complete search history.

(56) References Cited

U.S. PATENT DOCUMENTS

| | | | |
|---|---|---|---|
| 2014/0038658 A1* | 2/2014 | Sato ....................... | H04L 63/104 455/519 |
| 2015/0341570 A1* | 11/2015 | Jaynes ................ | G06F 3/04817 348/705 |

* cited by examiner

*Primary Examiner* — Ayodeji O Ayotunde
(74) *Attorney, Agent, or Firm* — Wood, Phillips, Katz, Clark & Mortimer

(57) ABSTRACT

A method is provided for sharing user data from a mobile source device with a host device in a safe and secure manner, with the intention to play the file or share the contents, using an intermediate connector pad, to ensure only the requested data type is transmitted while ensuring that the data integrity, quality, and connectivity are not compromised. The method includes all types and formats of digital data across the connector pad such as audio, video, voice, document, image, etc. file formats played through the source device are transmitted to the host device through the connector pad, and capable of connecting and handling both streaming type and non-streaming types of signals.

18 Claims, 8 Drawing Sheets

| What Do You Want To DO? | From | Data Source | File Type | To |
|---|---|---|---|---|
| Paly music | Smart phone | On Device | Document | Home Speaker Room 1 |
| Play video | Tablet | Internet | Video | Home Speaker Room 2 |
| Play video game | Laptop | External Drive | Voice | Vehicle Audio System |
| Make phone call | Camera | | Audio | SpeakerPhone |
| Use my contact list | Musical instrument | Wireless Mode | Image | TV |
| Share a document file | AR/VR headset | Wi-Fi | A/V | Laptop |
| Make payment | Game Console | Cellular | | Vendor POS |
| Share photo | Cable Set-top Box | Bluetooth | | Smart phone |

| What Do You Want To DO? | From | Data Source | File Type | To |
|---|---|---|---|---|
| Paly music | Smart phone | On Device | Document | Home Speaker Room 1 |
| Play video | Tablet | Internet | Video | Home Speaker Room 2 |
| Play video game | Laptop | External Drive | Voice | Vehicle Audio System |
| Make phone call | Camera | | Audio | SpeakerPhone |
| Use my contact list | Musical instrument | Wireless Mode | Image | TV |
| Share a document file | AR/VR headset | Wi-Fi | A/V | Laptop |
| Make payment | Game Console | Cellular | | Vendor POS |
| Share photo | Cable Set-top Box | Bluetooth | | Smart phone |

FIG. 5

SYSTEM AND METHOD FOR CONTROLLING, SHARING, RELEASE AND MANAGEMENT OF DIGITAL DATA BETWEEN SMART MOBILE DEVICE(S) AND EXTERNAL DEVICE(S) USING A CONNECTOR PAD

CROSS REFERENCE TO RELATED APPLICATIONS

This application is a continuation-in-part of co-pending U.S. Ser. No. 14/940,256, filed Nov. 13, 2015, the entire disclosure of which is incorporated herein by reference.

FIELD OF THE INVENTION

This application relates to a system and method for controlling, sharing, releasing and management of digital data between smart mobile device(s) and external device(s) using a connector pad.

BACKGROUND OF THE INVENTION

Traditionally, audio speakers and video systems are connected to their music and video sources by cables and wires. Those have worked well; but unfortunately, the need for multiple cables and plugs and wires made the connections messy at best. Later on, docking stations were developed and used for smart devices and the like, but such stations are being phased out due to rapid changing of device designs, country specific adapters, and evolving input-output configurations. For video, due to higher speed and increased band width requirements, no easy wireless option presently exists.

More recently, Bluetooth® speakers have been introduced. Using the Bluetooth technology, a mobile phone or other mobile device for playing music connects wirelessly with a Bluetooth speaker system.

Unfortunately, wireless connectivity can be tricky to use and maintain. Setup and initial configuration times are long. Depending on network signal strength and device access memory, sometimes the communication is repeatedly disrupted and must be restarted, going through the same long procedure all over again, causing great annoyance.

With Bluetooth, before the connection is successfully established, the devices need to be "paired" or linked together electronically. If other Bluetooth devices are present in the area, the process of device discovery, pairing, and authentication becomes time consuming. For security reasons, sometimes a system will need a password for authentication before a connection is allowed. If another device previously was most recently paired with the speaker, the information in the device memory may need to be erased, overwritten, or deactivated before the new device can be used; this involves an additional manual step, called "forget device", to be undertaken. A person may just give up the effort and do something else. More specifically, to connect to the Bluetooth-enabled speaker, one needs simultaneously to manipulate the controls (mostly on the device) of both the speaker unit and the mobile device to enable use of the speakers with the source device. Which means he or she has to get up from the comfort of the sofa to go through the re-connect procedure.

Also, since the Bluetooth system has a low bandwidth, it cannot support video playing, even with a large amount of video data compression. Typical Bluetooth systems can handle data in the range of 1-3 Mbits/second; however even a simple, black and white, 24 frame video can re-quite in excess of 7 Mbits/second of bandwidth.

SUMMARY OF THE INVENTION

The present invention is directed in one aspect to expanding the range of source and host device types and also the data types and data formats. Also, multiple users, with multiple source devices and multiple host devices being able to play simultaneously or one at a time, In accordance with another aspect, enhanced cyber-security, data privacy, and anti-spam/anti-virus protection features are achieved through a hardware, which is an intermediate device, called a connector pad. Able to use a user app in conjunction with the hardware, which is the connector pad to control what files are sent and able to not share or release or contain all other types of files being made available for sniffing, In accordance with a further aspect, quality of signals are restored or adjusted by scanning the sampled signals in a buffer to evaluate continuity, data integrity, signal strength and any other lost bits. Using error correction and digital signal processing protocols, able to recondition the signal to produce a higher quality output.

BRIEF DESCRIPTION OF THE DRAWINGS

FIG. 5 Some examples of selection options. Non-bold data are not shared with the host devices. Information is held off at the connector pad. Two examples are provided.

DETAILED DESCRIPTION

Figure 1:
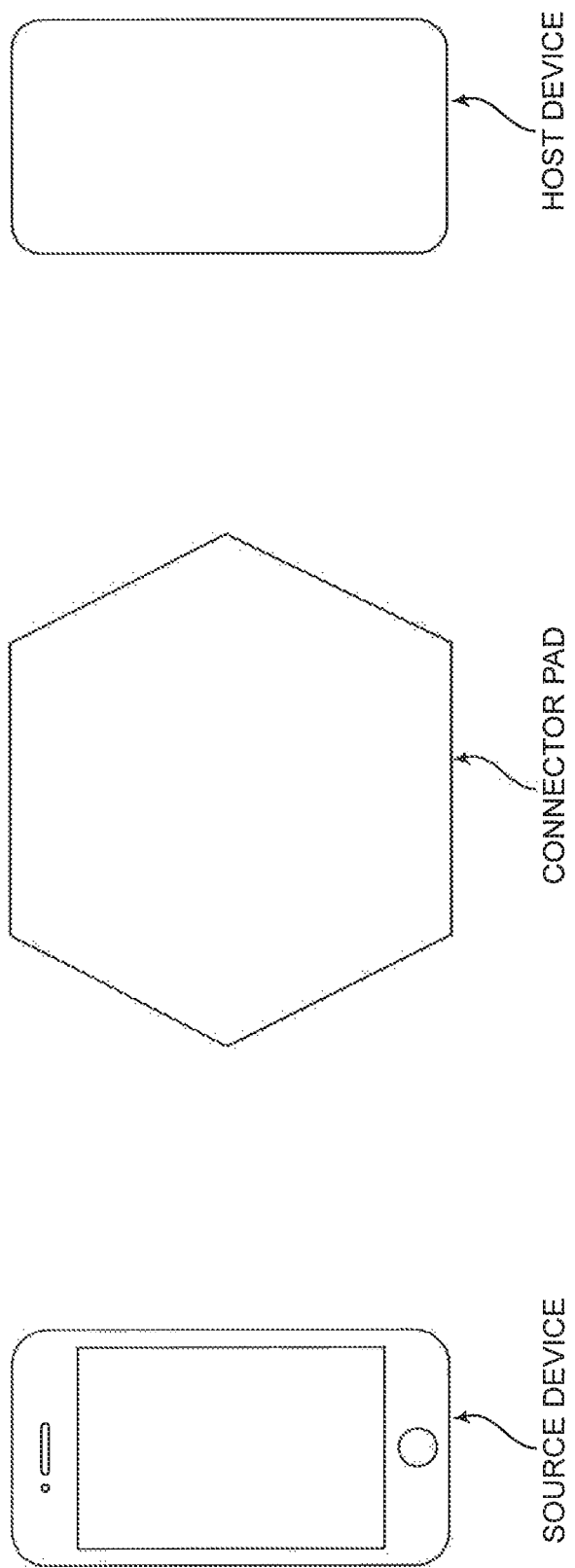
FIG. 1 is a system diagram showing the enhanced features of the connector pad.

The patent application Ser. No. 14/940,256, filed Nov. 13, 2015, the entire disclosure of which is incorporated herein by reference specifies a connector pad which is programmed to, inter alia, initiate a pairing routine which provides a wireless pairing between a smart mobile device and the connector pad, the connector pad then communicating wirelessly with the audio speaker or video display system to clear memory or prior retained information to resolve the device conflicts, and facilitating a handshake connection between the smart mobile device and external audio speaker or video display system to establish pairing and thereafter allowing direct streaming. The patent application refers to a method and system to address safety, security and uninterrupted streaming of audio and video data for multiple users. The connector pad operates as a firewall to manage data flow and manage priorities and privileges as established by the owner or administrator of the connector pad device. The application also referred to the role of the connector pad to monitor and supervise quality of the audio or video data being streamed and start a reactivation routine as soon as it senses a disruption or loss in connectivity. During regular operating mode, the connector pad may go into a standby mode and supervisor mode to preserve power The additional features and functionalities of this application allow the connector pad connectivity with a much wider range of data types and device types and offer additional user benefits for a much wider range of applications. The present application also describes more clearly the user groups or industry verticals that can benefit from the invention.

The invention addresses three major consumer concerns. The claims are accordingly structured First, expanding the range of source and host device and data types/formats. Also, can connect, play and manage multiple source and host devices, simultaneously or one at a time. The connection managed by the connector pad and the supporting user mobile App. The patent application was restricted to voice, audio and video data only; simultaneous host and source devices with dedicated channels were not included earlier. The concept of using a mobile App as a data manager was not included earlier.

A second concern is enhanced cyber-security, anti-virus/anti-spam and data privacy. Also, ensuring the user has total control over sharing and release of personal digital data with the host devices; eliminating any risk of inadvertently sharing other files and data. The measures are achieved through the connector pad that serves as a firewall and filter to screen the incoming data sets from the user's source device and allowing just the type of file or data that is requested to be sent. Further, a concern that the file may have virus or corrupt, which may in turn damage the host device has been addressed using a scanning routine within the connector pad that looks for malicious code. The anti-spam and anti-virus checks are run using updated software to keep it current.

Third, quality of signals and continuity of signals may be lost due to several reasons. By incorporating a quality assurance feature, the listener or viewer or user is assured that the user experienced is enhanced through a series of digital signal processing and data reconditioning. Predictive features using principles of AI and machine learning capabilities within the connector pad and overall system to enable the system to improve wireless connection restoration, anomaly detection, signal strength compensation, data reconstruction and error correction capability.

The application outlines a method and system using a combination of device architecture, embedded electronics and wireless connectivity protocols.

Certain terminology is used herein for convenience only and is not to be taken as a limitation on the embodiments of the present invention.

General Configuration

Figure 2:
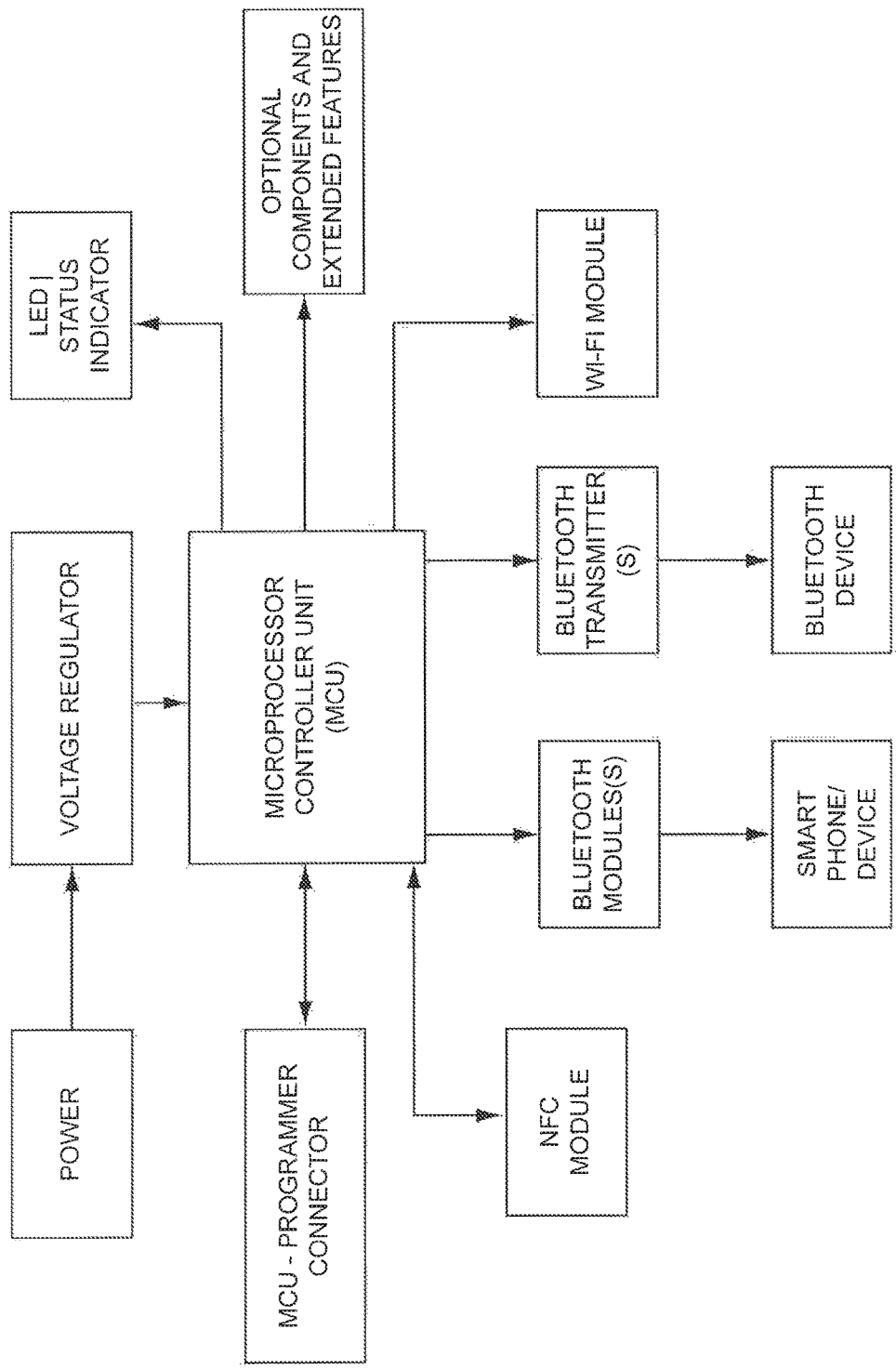
FIG. 2 shows the general configuration of the connector pad including an MCU, having internal connections with NFC, Wi-Fi, Bluetooth modules. These modules have independent channels for voice, data, video, etc.
Figure 3:
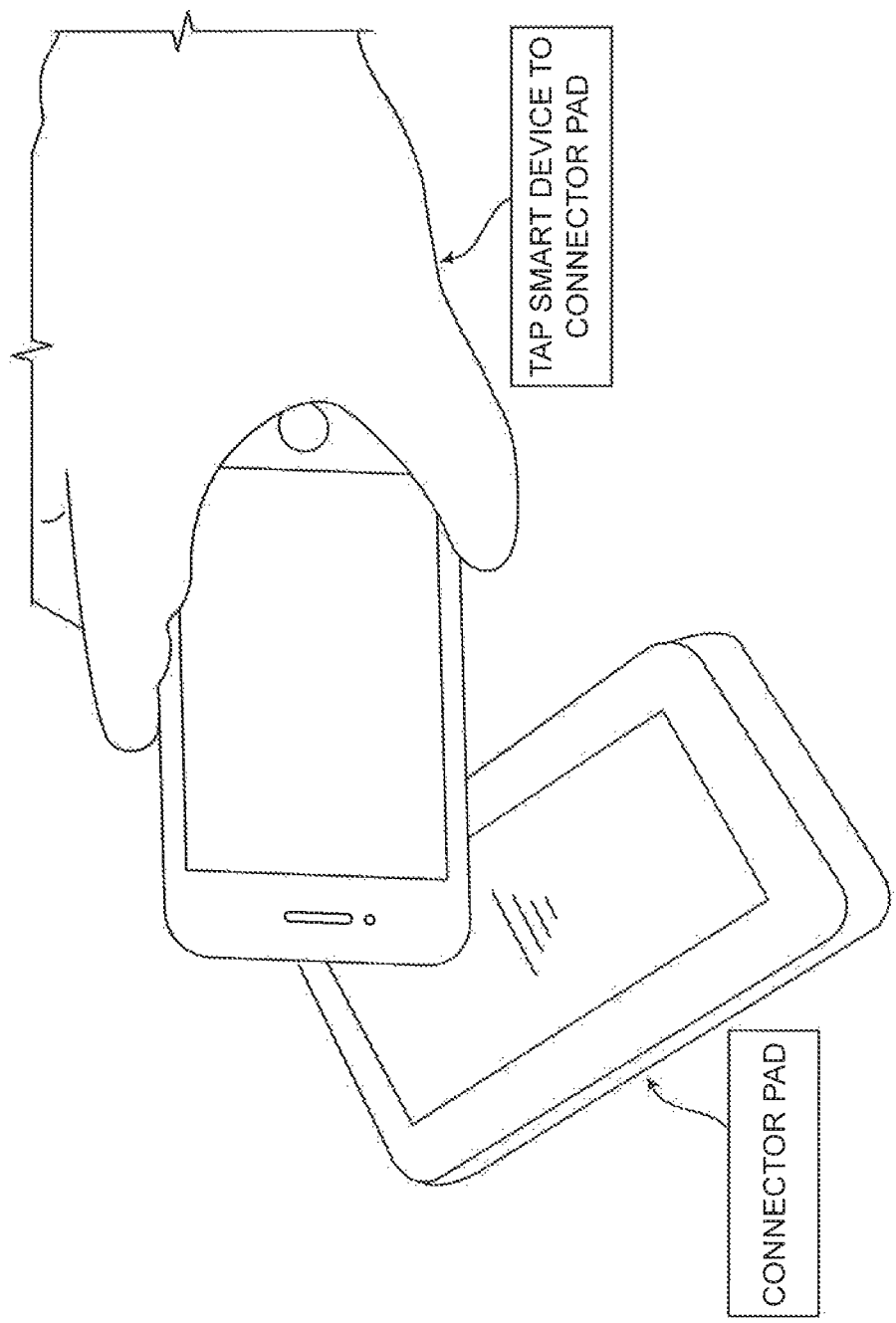
FIG. 3 is a diagram to illustrate how a smart phone is brought near the connector pad to initiate the connection and data transfer protocol.

FIGS. 1 and 2 are a system diagram and a device block diagram showing the enhanced features of the connector pad. The source device can be someone's smart phone equipped with industry-standard wireless protocols with the capability to connect to third party devices. The source device can also be wirelessly enabled which can transmit data to a host device. Examples are digital cameras, musical instruments, microphones, etc. The data can be both streaming and non-streaming. The host devices are connected via Bluetooth or Wi-Fi with the connector pad. Host devices can be audio speakers, TV or display monitors, laptop, another smartphone etc. FIG. 2 shows the general configuration of the connector pad including an MCU, having internal connections with NFC, Wi-Fi, Bluetooth modules. These modules have independent channels for voice, data, video, etc. in as many replicates to support multiple concurrent users. Of course, this dedicated configurability comes at the expense of space, programming complexity and unit cost. Depending on the number of multiple concurrent users are required, as many modules can be set up. Alternately, virtualization of the modules is possible to conserve resource and bandwidth requirements as long one to one correspondence is preserved.

Referring to FIG. 1, an attempt is made to define the device type. Two device types are referenced. Source devices and Host devices. Source devices include, but not limited to smart phones, digital cameras, musical instruments, musical accessories, laptops, gaming consoles, tablets, etc. The host devices receive and play the transmitted data. This may be an audio speaker, a speakerphone, a stereo system in the vehicle, a PA system for larger audience, a TV, or even a point of sale (POS) device for transacting payment. The source device must be enabled with industry-standard wireless protocols to connect with the connector pad. There are a wide range of industry-standard wireless protocols, such as Wi-Fi, Bluetooth, NFC, Optical, etc. The connector pad also has a mobile user app that can be downloaded into the user's smart phone. The user mobile app acts as a control center for the user to authorize releasing any datatype to the host device. All other forms of data are firewalled and not allowed to be transmitted.

Role of an Intermediate Device Between Source and Host Devices

Every mobile device capable of wirelessly transmitting data carries multiple data types. Different receiving systems have sensors and readers to collect and read multiple types of data, when paired with the user's device. The actions taken by the industry is to develop software to prevent inadvertent and accidental release of user's data. While this is an effective approach, it is only a matter of time when more sophisticated host devices will be able to overcome the restrictions placed by the software in a user's source device. An example is the electronics in the rental cars' audio entertainment systems. While connecting one's phone to make a call using the car's speakers and microphone, it is common to see the contact list, music playlist, etc. all being synched with the car audio system. Some host and source devices offer better controls, but in general the source devices are exposed to sniffing and piracy.

FIG. 1 shows introduction of a physical device that intervenes the direct wireless contact between the source device (smartphone) and the host device (TV, or audio speaker). The pairing between the user's smart phone and the connector pad established a single line of communication. The connector pad, being the property of the owner or a trusted agent, has access to all data types and files the user has on his or her smartphone. However, until expressly and clearly conveyed, the connector pad will not release any file or data to the host system. In addition, the connector pad scrutinizes the quality and cleanliness of the data and ensures only clean and authorized data is transmitted to the lost device. Further, after the user disconnects the system (either stops playing music or video, etc.), the connector pad offers the option to completely erase user's personal information, to protect the user's information from being available to the next user (example rental cars).

The Connector Pad, Enhanced Version

FIG. 2 shows the adaptability and flexibility of the connector pad. Independent modules for NFC, Wi-Fi, Bluetooth etc. are connected to the microprocessor unit. The microprocessor units have multiple I/O channels to allow dedicated connections to each user source device. The voice, data, audio, video etc. data modules are separated to allow individuals controls for releasing the data to the host device. Additional memory and capabilities to upgrade software through boot loading is allowed. Multiple LEDs serve as visual indicators. Power supply, surge protection and voltage regulation features protect the device board. Embedded programming ca be upgraded as needed to keep the device current. Additional features include virus protection and logic for quality assurance.

The connector pad receives its command from the mobile app. The app has a visual interface.

The Mobile App

The app can be downloaded into the user's smart phone. The app communicates directly with the connector pad. The user selects what he or she would like to do and enters the selection. The user also directs the host device type and the data that is permitted to share. Every other data type is shut off and cannot be released to the host device unless the user changes the settings. Some examples have been shown. Multiple elections may be possible in cases like phones. Use may allow the device to access the phone book in the smart phone to make calls. Also, allow only voice data to be released. This prevents music files, playlists etc. from being shared. This is done through the commands entered through the user's mobile app, which in turn activates the modules for forwarding the data type after the data has been screened, analyzed, re-conditioned or remedied and deemed suitable for forwarding.

Figure 4:
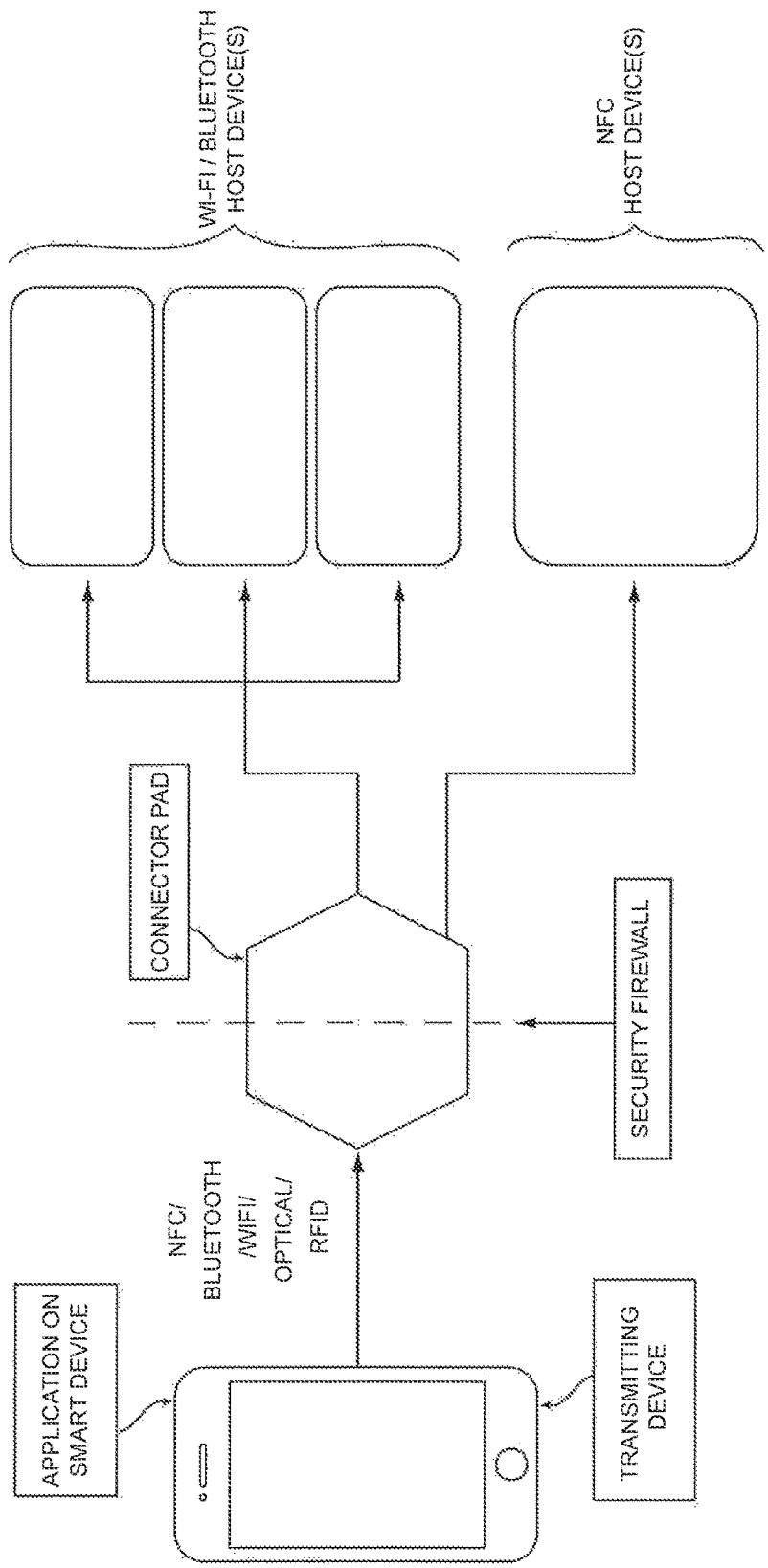
FIG. 4 is an illustrative representation of the concept of the connector pad acting as a filter and gateway to protect and selectively transmit data to the host device, using a mobile app for user interface. (note: the selection options are for illustration only; other choices may be added)

FIGS. 4 and 5 show an example of a user page on the mobile app.

Quality Assurance Features

Figure 6:
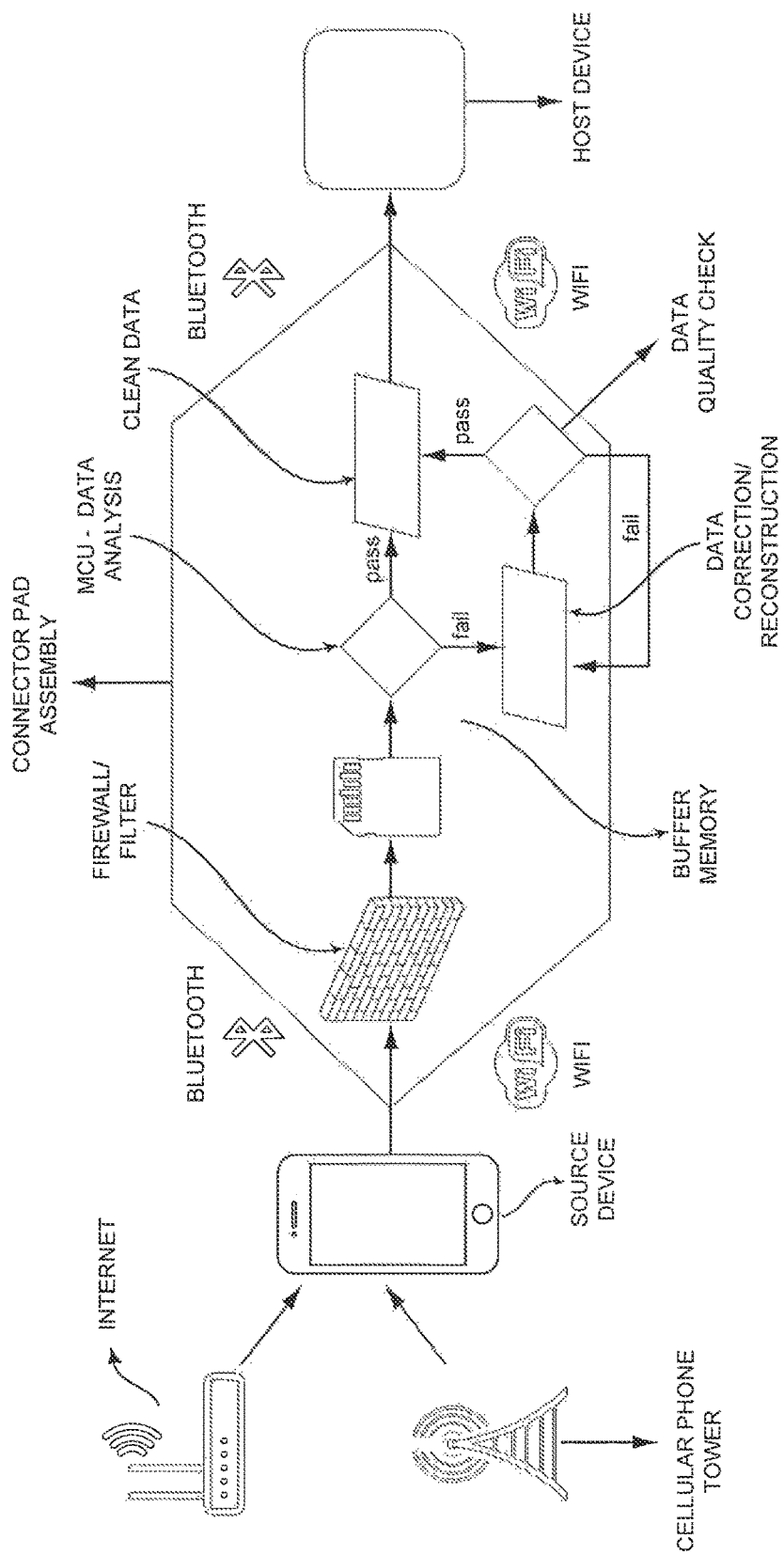
FIG. 6 An example of the quality assurance procedure for error correction for disruption free and high-fidelity transmission of streaming and non-streaming data. Different error correction protocols exist based on data type and whether the data is streaming or non-streaming (discrete). The central section is an exploded schematic view of the connector pad. The data, if the quality assurance option is selected, flows through the connector pad. The data is buffered in the SRAM unit and released to the MCU for analysis for data integrity. Once the data is approved, it is them forwarded for transmission to the host device. If the data is found corrupt or missing, whether due to connection loss or lost packets, either the connector pad will re-activate the connection or attempt to correct the error and forward to the host device. Optional quality assurance modules are available to check, reconstruct or reactivate the data.

FIG. 6 shows the basic function of the quality assurance feature. When the option is turned on, using the mobile app, the data from the source device is directed into the connector pad. The connector pad checks the data for virus or other harmful elements and checks for data continuity and integrity. This is made possible by sampling a predetermined quantity of the data in a buffer, and forwarding it for analysis and if needed, remedial actions to restore the connection or signal quality. Holding the signal in the buffer causes a small delay, which will allow the MCU to perform the analysis and supervisory actions on the data. The continuity of the streaming signals is also checked and maintained. The connector pad forwards the data to the host device. If the devices senses loss in data connections, the routine to re-activate is automatically executed. If the data stream is present but the quality of the data is weakened due to network issues or system interference or noise, the device attempts to amplify the signal to increase the signal to noise ratio. If the packets or data bits are missing, the connector pad attempts to reconstruct using a standard error code control routine. Depending on the type of data being transmitted, the error rate is determined. Example, voice data may require 10-2 max error rate (1 bit out 100 missing) but in other streaming types, like data and video, higher error rates are mandated. Forward error control features offer a proactive measure. Upon source device disconnection from the connector pad, all user history is erased from the connector pad memory. If no data is sent from the source device within a programmable time frame of initial connection, all user history is erased from the connector pad memory.

Following checks are performed by the connector pad on the incoming data.

Virus checks,
Lost connection
Broken or missing bits
Fading
High noise or interference A similar quality assurance module is offered to the host device. This unit assures the integrity and cleanliness of the data being transmitted by the connector pad.

This is done during the screening and analysis process. Updated anti-spam and anti-virus software are previously loaded in the connector pad which scans the incoming data and stops any malicious elements. Remedial action assures only clean data is transmitted to the host device thereby protecting the host device as well from getting corrupt.

Multiple Device Features

Figure 7:
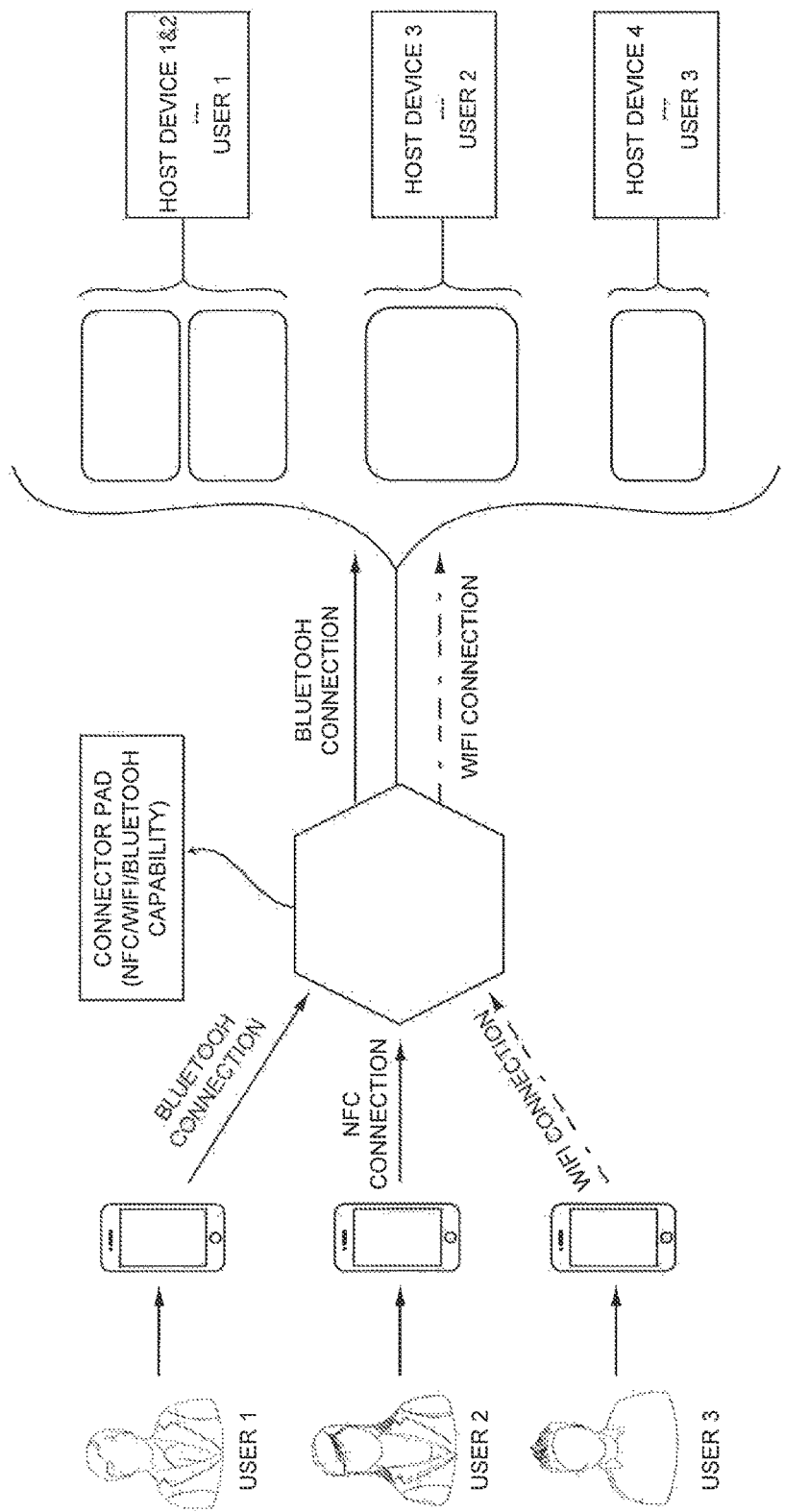
FIG. 7 The diagram shows that the connector pad can be used by multiple users (multiple source devices) simultaneously on host devices. The connector pad authenticates the user, based on the prior permission granted by the owner/administrator, to play music or watch movie in their own environment through dedicated channels established by the connector pad mobile user app.

FIG. 7 shows that the connector pad can accept requests from multiple users simultaneously. The priority and access privileges are established in advance by the owner/administrator. The individual modules inside the connector pad allow dedicated channels for each user. Modules include Wi-Fi, Bluetooth, for each data type. Voice, data, audio, video etc.

Disconnect and User Information Erase Algorithm

Figure 8:
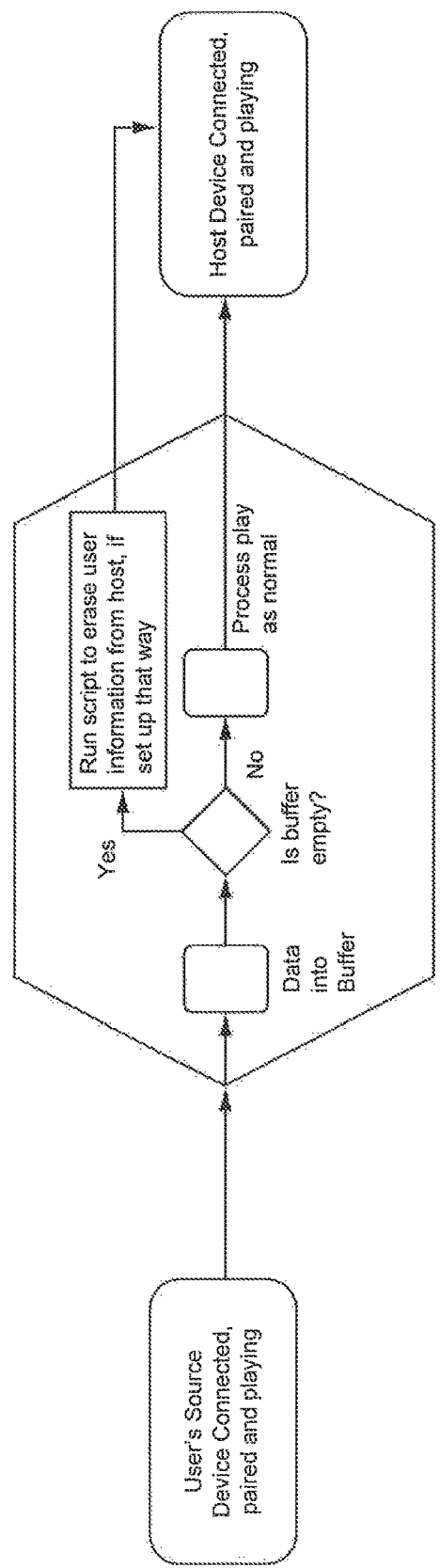
FIG. 8 The diagram shows a schematic representation of the logic used for erasing user's information from host devices after the user has disconnected the source device, stopped playing music, or video, etc. or has shut the power off. Erasing the information protects the user from getting personal information being displayed and visible to the next user using the same host device.

FIG. 8. shows the algorithm used to erase user information, when the device is disconnected. The is an optional, user elect feature. The purpose of this feature is not to leave any user data or information in a host device (most likely not owned by the user, for example, a rental car audio system) after the user disconnects, stops playing and leaves. The method this is done is by examining the refresh rate of data bits in the buffer in the connector pad. If the data refresh is zero or set buffer is empty, a script is run by the connector pad to send a series of command to erase user information from the host device. In the event, the main power supply is cut off from the connector pad, the internal battery power serves to provide the needed power to run the script.

The present invention has been described with respect to flowcharts and block diagrams. It will be understood that each block of the flowchart and block diagrams can be implemented by computer program instructions. These program instructions may be provided to a processor to produce a machine, such that the instructions which execute on the processor create means for implementing the functions specified in the blocks. The computer program instructions may be executed by a processor to cause a series of operational steps to be performed by the processor to produce a computer implemented process such that the instructions which execute on the processor provide steps for implementing the functions specified in the blocks. Accordingly, the illustrations support combinations of means for performing a specified function and combinations of steps for performing the specified functions. It will also be understood that each block and combination of blocks can be implemented by special purpose hardware-based systems which perform the specified functions or steps, or combinations of special purpose hardware and computer instructions.

It will be appreciated by those skilled in the art that there are many possible modifications to be made to the specific forms of the features and components of the disclosed embodiments while keeping within the spirit of the concepts disclosed herein. Accordingly, no limitations to the specific forms of the embodiments disclosed herein should be read into the claims unless expressly recited in the claims. Although a few embodiments have been described in detail above, other modifications are possible. For example, the logic flows depicted in the figures do not require the order shown, or sequential order, to achieve desirable results. Other steps may be provided, or steps may be eliminated, from the described flows, and other components may be added to, or removed from, the described systems. Other embodiments may be within the scope of the following claims.

The foregoing disclosure of specific embodiments is intended to be illustrative of the broad concepts comprehended by the invention.

I claim:

1. A method for sharing user data from a mobile source device with a host device in a safe and secure manner, with the intention to play the file or share the contents, using an intermediate connector pad, to ensure only the requested data type is transmitted while ensuring that the data integrity, quality, and connectivity are not compromised, the method comprising:
   a. all types and formats of digital data across the connector pad such as audio, video, voice, document, image, etc. file formats played through the source device are transmitted to the host device through the connector pad, and
   b. capable of connecting and handling both streaming type and non-streaming types of signals.

2. The method of claim 1, wherein the connector pad allows multiple users, multiple source and host devices, and multiple device types, all controlled through the connector pad, either simultaneously or one at a time.

3. The method of claim 1, wherein an optional quality assurance module for the external host, connector pad, or receiving devices analyzes the incoming data for continuity, file fidelity, and signal strength by using a local buffer and then releasing a continuous and re-conditioned output signal stream or discrete data to the receiving device.

4. The method of claim 1, wherein implementing algorithm(s) to predict potential file transfer or file corrupt issues and proactively reconstruct them, if possible with minimum interruption to the user or the receiver.

5. A method in which the connector pad is receiving and analyzing user's data for authenticity through a data firewall, forwarding the user preferences, and data type only to what is requested, preventing the passing of all the data types that have not been authorized for sharing.

6. The method of claim 5, wherein the connector pad runs an erase command, erasing all source device user information from its memory, the method comprising:
   a. disconnecting the source device from the connector pad
   b. failing to send any sort of data from the source device to the connector pad within a programmable time frame of the initial connection.

7. The method of claim 5, wherein an algorithm and a decision tool, using a smart-device based user application, allowing the user of the source device (or, the owner of the source device) to select the specific data types one wants to be released to the external host device through the connector pad.

8. The method of claim 5, wherein a controlled release gateway using the mentioned algorithm, programming logic, and the supporting hardware in the connector pad, is reviewing the user's share preferences to release the specific data files and data types to the external host device.

9. The method of claim 5, wherein the authenticity for incoming signals is being verified, acting as an anti-virus and anti-spam agent to block any files deemed suspicious, sending an electronic alert to the user notifying of the observation, the method comprising:
   a. offering this feature on the connector pad device, as well as an optional add-on quality-assurance device for the external host devices or connector pad to protect the receiving equipment from be corrupted or compromised.

10. A system for sharing user data from a mobile source device with a host device in a safe and secure manner, with the intention to play the file or share the contents, using an intermediate connector pad, to ensure only the requested data type is transmitted while ensuring that the data integrity, quality, and connectivity are not compromised, the system comprising:
    a. All types and formats of digital data across the connector pad such as audio, video, voice, document, image, etc. file formats played through the source device are transmitted to the host device through the connector pad,
    b. And capable of connecting and handling both streaming type (audio, video, A/V, voice, etc.) or non-streaming (discrete) type of signals (image, document, contact list, etc.).

11. The system of claim 10, wherein the connector pad allows multiple users, multiple source and host devices, and multiple device types, all controlled through the connector pad, either simultaneously or one at a time.

12. The system of claim 10, wherein an optional quality assurance module for the external host, connector pad, or receiving devices analyzes the incoming data for continuity, file fidelity, and signal strength by using a local buffer and then releasing a continuous and re-conditioned output signal stream or discrete data to the receiving device.

13. The system of claim 10, wherein implementing algorithm(s) to predict potential file transfer or file corrupt issues and proactively reconstruct them, if possible with minimum interruption to the user or the receiver.

14. A system in which the connector pad is receiving and analyzing user's data for authenticity through a data firewall, forwarding the user preferences, and data type only to what is requested, preventing the passing of all the data types that have not been authorized for sharing.

15. The system of claim 14, wherein the connector pad runs an erase command, erasing all source device user information from its memory, the system comprising:
   a. disconnecting the source device from the connector pad
   b. failing to send any sort of data from the source device to the connector pad within a programmable time frame of the initial connection.

16. The system of claim 14, wherein an algorithm and a decision tool, using a smart-device based user application, allowing the user of the source device (or, the owner of the source device) to select the specific data types one wants to be released to the external host device through the connector pad.

17. The system of claim 14, wherein a controlled release gateway using the mentioned algorithm, programming logic, and the supporting hardware in the connector pad, is reviewing the user's share preferences to release the specific data files and data types to the external host device.

18. The system of claim 14, wherein the authenticity for incoming signals is being verified, acting as an anti-virus and anti-spam agent to block any files deemed suspicious, sending an electronic alert to the user notifying of the observation, the system comprising:
   a. offering this feature on the connector pad device, as well as an optional add-on quality-assurance device for the external host devices or connector pad to protect the receiving equipment from be corrupted or compromised.

* * * * *